United States Patent Office  3,390,197
Patented June 25, 1968

3,390,197
NOVEL TRICYCLIC COMPOUNDS AND NOVEL PROCESSES FOR PRODUCING TRICYCLIC COMPOUNDS
William F. Erman, Ronald G. Lewis, and David H. Gustafson, Cincinnati, Ohio, assignors to The Procter & Gamble Company, Cincinnati, Ohio, a corporation of Ohio
No Drawing. Filed May 13, 1966, Ser. No. 549,812
8 Claims. (Cl. 260—666)

This invention relates to new tricyclic compounds. More specifically, the invention concerns the novel tricyclic compounds 1,7-dimethyl-7-(1-prop-2-ynyl)nortricyclene and 1,7-dimethyl-7-(1-prop-1-ynyl)nortricyclene, novel related tricyclic compounds, and novel methods for the production of said novel tricyclic compounds and other known tricyclic compounds.

It is therefore a primary object of this invention to provide heretofore unknown tricyclic compounds.

It is a more specific object of this invention to provide the novel tricyclic compounds 1,7-dimethyl-7-(1-prop-2-ynyl)nortricyclene and 1,7-dimethyl-7-(1-prop-1-ynyl)nortricyclene (where appropriate hereinafter, these compounds are respectively abbreviated as "2-PNT" and "1-PNT"), said compounds having desirable aromatic, i.e., odor characteristics.

It is a further object of this invention to provide novel tricyclic compounds which are related to 2-PNT and 1-PNT and which also have desirable aromatic characteristics.

It is still a further object of this invention to provide a process for the preparation of 2-PNT and 1-PNT.

It is an additional object of this invention to provide a novel method for preparing tricycloekasantalal, a known and useful tricyclic compound.

Production of 2-PNT and 1-PNT

A key element in the achievement of the above-mentioned and other objects is the discovery of a novel process for preparing a compound selected from the group consisting of 1,7 - dimethyl-7-(1-prop-2-ynyl)nortricyclene, 1,7-dimethyl - 7 - (1 - prop-1-ynyl)nortricyclene and mixtures thereof, which comprises reacting π-bromotricyclene with lithium acetylide. The 2-PNT and 1-PNT compounds formed by said process are novel tricyclenes having the general formula

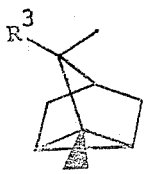

wherein R³ is selected from the group consisting of CH≡C—CH₂— and CH₃—C≡C— for 2-PNT and 1-PNT respectively.

The above-mentioned process is discussed in detail hereinafter and is illustrated schematically in FIGURE 1.

π-Bromotricyclene, the starting material in the herein described reaction, can be prepared by a four-step process starting with the readily available material (+)α-bromocamphor according to the method of Corey et al. [Journal of the American Chemical Society 79, 5773 (1957)]. Basically, the method of Corey et al. involves: first, the reaction of (+)α-bromocamphor with chlorosulfonic acid in the presence of bromine to form α,π-dibromocamphor; second, the reaction of α,π-dibromocamphor with zinc in the presence of methylene chloride and hydrogen bromide to form π-bromocamphor; third, the reaction of π-bromocamphor with hydrazine and acetic acid in absolute ethanol solution to form π-bromocamphor hydrazone; and fourth, the reaction of π-bromocamphor hydrazone with mercuric oxide in acetic acid to form π-bromotricyclene. More specific details on the preparation of π-bromotricyclene are found in Corey et al., supra.

Lithium acetylide per se can be satisfactorily reacted with the π-bromotricyclene. Preferably, however, a lithium acetylide-stabilizing agent complex is used in the reaction because of the relatively unstable nature of lithium acetylide. Examples of stabilizing agents that can be complexed with lithium acetylide in stabilizing amounts for use herein are amines such as ethylene diamine, tetramethylethylene diamine and dimethylethylene diamine. A complex containing about 1 part ethylene diamine and about 1 part lithium acetylide is commercially available and represents a preferred lithium acetylide reagent.

A polar solvent is preferably used as a medium for the reaction of π-bromotricyclene and lithium acetylide. Examples of suitable polar solvents are ethers, preferably of from 4 to 10 carbon atoms, most preferably cyclic monooxy ethers such as tetrahydrofuran, cyclic dioxy ethers such as dioxane, and aliphatic dioxy ethers such as ethylene glycol dimethyl ether or diethylene glycol dimethyl ether; amides, preferably amides of carboxylic acids containing from 1 to about 6 carbon atoms such as dimethylformamide, diethylformamide, dimethylacetamide, diethylacetamide, and N-methyl pyrrolidone; phosphoramides such as hexamethylphosphoramide; amines, preferably aromatic amines such as pyridine; sulfones such as tetrahydrothiophene-1,1-dioxide, preferably dialkyl sulfones of from 2 to 5 carbon atoms such as dimethyl sulfone; and sulfoxides, preferably dialkyl sulfoxides of from 2 to 5 carbon atoms such as dimethyl sulfoxide, and diethyl sulfoxide. In general, sulfoxides, amides, and phosphoramides are preferred solvents. Mixtures of the above-named solvents can also be used.

It has been discovered that excellent conversions, e.g., more than 80% of the theoretical yield of π-bromotricyclene reactant into 2-PNT and 1-PNT products can be obtained with certain selected solvents. Examples of such solvents, which are preferred for high yields, are dimethyl sulfoxide and hexamethylphosphoramide.

It has further been discovered that the choice of solvent influences the relative proportions of 2-PNT and 1-PNT products. Dimethylformamide is a highly preferred solvent when it is desired to maximize the ratio of 2-PNT to 1-PNT. Hexamethylphosphoramide is a highly preferred solvent when it is desired to maximize the ratio of 1-PNT to 2-PNT. As discussed hereinafter, each of the products

FIGURE 1

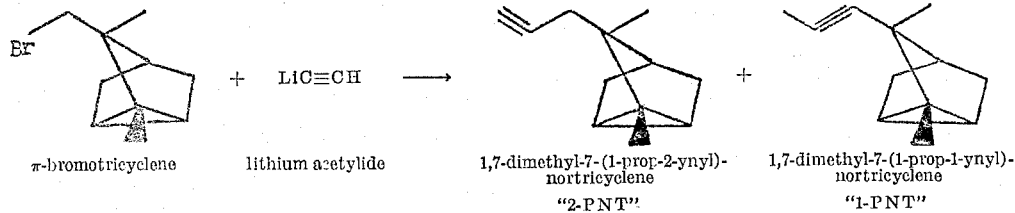

π-bromotricyclene    lithium acetylide    1,7-dimethyl-7-(1-prop-2-ynyl)-nortricyclene    1,7-dimethyl-7-(1-prop-1-ynyl)-nortricyclene
"2-PNT"    "1-PNT"

2-PNT and 1-PNT can have a separate utility and therefore optimization of either of these products is desirable depending on the ultimate end use contemplated.

The reaction can be carried out over a wide temperature range, e.g., from about 5° C. to about 150° C., preferably from about 20° C. to about 110° C. Surprisingly, when dimethyl sulfoxide is used as the solvent, maintenance of the reaction temperature within certain critical ranges also influences the relative proportions of 2-PNT and 1-PNT products. When dimethyl sulfoxide is the solvent, for example, maintaining the reaction temperature within the range of from about 23° C. to about 27° C. favors the formation of 2-PNT whereas maintaining the temperature in the range of from about 40° C. to about 110° C. favors the formation of 1-PNT.

Therefore, the above-discussed relationships between the reaction temperature, solvents, and the resulting products, are summarized as follows: when it is desired that the 2-PNT product predominate, preferred conditions for the reaction are dimethylformamide as the solvent, or more preferably, dimethyl sulfoxide as the solvent coupled with a temperature ranging from about 23° C. to about 27° C. When it is desired that the 1-PNT product predominate, preferred conditions for the reaction are dimethyl sulfoxide as the solvent coupled with a temperature ranging from about 40° C. to about 110° C., or more preferably, hexamethylphosphoramide as the solvent.

The concentration of each of the reactants, $\pi$-bromotricyclene or lithium acetylide, in the solvent is not highly critical. It is desirable, however, to have a homogeneous system. Preferably, the concentration of $\pi$-bromotricyclene is within the range of from about 10% weight per unit volume to about 20% weight per unit volume and the concentration of lithium acetylide is within the range of from about 5% weight per unit volume to about 30% weight per unit volume.

Preferably, the 2-PNT and 1-PNT products are separated from the reaction mixture, and separated from each other, by conventional extraction, distillation and chromatographic techniques.

More specifically, the propyne products can be removed from the reaction mixture by: diluting the reaction mixture with water, saturating the diluted mixture with ammonium chloride and then extracting with n-hexane; washing said extracts with water and saturated sodium chloride, then drying the washed extracts over anhydrous sodium sulfate; removing the n-hexane by vacuum distillation to recover a light yellow oil fraction boiling from about 50° C. to about 65° C. at 2.7 mm. of mercury pressure. This fraction contains the 2-PNT and 1-PNT products as well as any unreacted $\pi$-bromotricyclene.

Further separation of the three components comprising the above-mentioned fraction can be accomplished by gas-liquid chromatography. Alternatively, the separation of 2-PNT from 1-PNT and the further separation of 1-PNT from $\pi$-bromotricyclene can be accomplished according to the following procedure: Adding alcohol (preferably ethanol), water and silver nitrate to the above-mentioned fraction with stirring (preferably in the absence of light) to form a precipitate comprising the silver salt of 2-PNT; removing the precipitate by filtration and washing it with ethanol-water followed by diethyl ether; suspending the washed precipitate in carbon terachloride, shaking with hydrochloric acid (preferably about 2 N), separating the carbon tetrachloride layer and drying over anhydrous sodium sulfate; removing the carbon tetrachloride by vacuum distillation and further distilling to recover pure 2-PNT, adding water to the above filtrate (the solution remaining after removal of the 2-PNT-silver salt precipitate), extracting with n-hexane, drying said extracts over anhydrous sodium sulfate, and removing the n-hexane by vacuum distillation to recover a pure 1-PNT/$\pi$-bromotricyclene mixture; the 1-PNT and $\pi$-bromotricyclene can be separated from each other by fractional distillation.

Thus, in summary, a primary part of this invention provides a process for preparing a compound selected from the group consisting of 1,7-dimethyl-7-(1-prop-2-ynyl) nortricyclene, 1,7 - dimethyl - 7 - (1 - prop - 1 - ynyl)nortricyclene and mixtures thereof, which comprises the process of reacting $\pi$-bromotricyclene with lithium acetylide. Particular preferred embodiments of said process are as follows: The lithium acetylide comprises a complex of lithium acetylide with a stabilizing agent, preferably an amine, most preferably ethylene diamine in a 1:1 ratio with said lithium acetylide; the solvent is selected from the group consisting of ethers, amides, phosphoramides, amines, sulfones and sulfoxides, preferably sulfoxides, amides and phosphoramides, most preferably, dimethyl sulfoxide, dimethylformamide and hexamethylphosphoramide; the reaction temperature ranges from about 5° C. to about 150° C., preferably from about 20° C. to about 110° C.; the concentration of $\pi$-bromotricyclene in the solvent ranges from about 10% weight per unit volume to about 20% weight per unit volume; the concentration of lithium acetylide in the solvent ranges from about 5% weight per unit volume to about 30% weight per unit volume; and optionally, the 1,7-dimethyl-7-(propynyl)nortricyclene products are separated from the reaction mixture.

Additional highly preferred embodiments to selectively optimize the production of the particular products of the reaction are: (1) For 1,7-dimethyl-7-(1-prop-2-ynyl) nortricyclene—a reaction temperature ranging from about 23° C. to about 27° C. with the use of dimethyl sulfoxide as the solvent; and (2) for 1,7-dimethyl-7-(1-prop-1-ynyl)nortricyclene—hexamethylphosphoramide as the solvent.

Novel tricyclic compounds

Both 2-PNT and 1-PNT are novel compounds and have desirable aromatic properties, e.g., both of these compounds possess a camphoraceous (pine-cedar) odor. These compounds therefore have utility as components of perfume compositions or as odorants per se in applications where a camphoraceous odor is desired. For example, these compounds can be utilized in various perfume compositions for ultimate use in products such as soaps, detergents, room deodorants, personal deodorants, and the like wherein they can be used in odoriferously effective amounts to impart the above-described odors to said perfume compositions. A perfume composition containing from about 0.0001% to about 100%, preferably from about 0.1% to about 50% of 1-PNT or 2-PNT is highly desirable and useful.

In addition to the above odorant utility, 2-PNT and 1-PNT are useful as intermediates in organic syntheses, particularly in the syntheses of other tricyclic compounds, both known and novel, as illustrated hereinafter.

Novel 7-substituted-1,7-dimethylnortricyclenes, i.e., $\pi$-substituted tricyclene compounds, other than the 2-PNT and 1-PNT compounds exemplified above have been discovered and are also a part of this invention. These compounds are represented by the general formula:

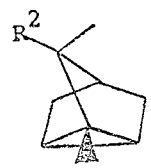

wherein $R^2$ is selected from the group consisting of

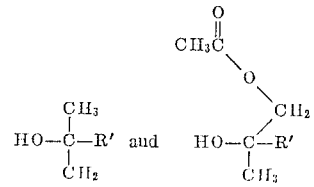

and R' is a radical selected from the group consisting of

—C≡C—CH$_2$—, —CH=CH—CH$_2$—, and
—CH$_2$—CH$_2$—CH$_2$—

Such compounds are all prepared by use of 2-PNT as a starting material as illustrated hereinafter in Examples II to V. These compounds also have desirable aromatic characteristics and therefore find utility as components of perfume compositions for use in products such as deodorants, soaps, detergents, and the like wherein said compounds can be used in amounts of from about 0.0001% to about 100%, preferably from about 0.1% to about 50% of the perfume composition. Table I below lists each individual compound of the above-mentioned group, as well as its formula, specific odor characteristic, and the specific example illustrating a method of preparing said compound.

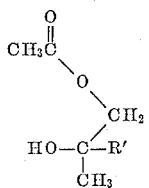

and R' is a radical selected from the group consisting of
—C≡C—CH$_2$—, CH=CH—CH$_2$—, and

—CH$_2$—CH$_2$—CH$_2$

TABLE I

| Compound | Formula | | Example (Illustrating method of preparation) | Odor |
|---|---|---|---|---|
| | R$^2$ | R' | | |
| π[1(3-hydroxy-3-methylbut-1-ynyl)]tricyclene. | HO—C(CH$_3$)$_2$—R' | —C≡C—CH$_2$— | Example II, page 26, infra | Sweet, woody, sandalwood-cedar. |
| π[1(3-hydroxy-3-methylbut-1-cis-enyl)]tricyclene. | HO—C(CH$_3$)$_2$—R' | —CH=CH—CH$_2$— | Example III, page 28, infra | Woody. |
| π[1(3)hydroxy-3-methylbutyl)]tricyclene. | HO—C(CH$_3$)$_2$—R' | —CH$_2$—CH$_2$—CH$_2$— | Example III, page 27, infra | Sandalwood. |
| π[1(3-hydroxy-3-acetoxymethylbut-1-ynyl)]tricyclene. | CH$_3$—C(O)—O—CH$_2$, OH—C(CH$_3$)—R' | —C≡C—CH$_2$— | Example IV, page 29, infra | Woody. |
| π[1(3-hydroxy-3-acetoxymethylbut-1-cis-enyl)]tricyclene. | CH$_3$—C(O)—O—CH$_2$, HO—C(CH$_3$)—R' | —CH=CH—CH$_2$— | Example V, page 30, infra | Do. |
| π[1(3-hydroxy-3-acetoxymethylbutyl)]tricyclene. | CH$_3$—C(O)—O—CH$_2$, HO—C(CH$_3$)—R' | —CH$_2$—CH$_2$—CH$_2$— | Example V, page 30, infra | Citrus floral. |

Therefore, in partial summary, this invention provides as novel compositions of matter, tricyclene compounds of the general formula

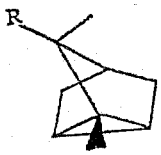

wherein R is selected from the group consisting of

CH≡C—CH$_2$—, CH$_3$—C≡C—, HO—C(CH$_3$)$_2$—R'

Preparation of tricycloekasantalal

Tricycloekasantalal is a known compound and has been previously prepared as a degradation product of naturally occurring α-santanol. See, for example, Simonsen and Owen, "The Terpenes," vol. III, 2nd ed., page 180. This compound has particular utility as an organic chemical intermediate. A novel and useful organic synthesis utilizing tricycloekasontalal as a starting material is disclosed in the U.S. patent application of Ronald G. Lewis and William F. Erman, filed concurrently herewith.

It has now been discovered, as a part of this invention, that tricycloekasantalal can be conveniently prepared by a novel process which comprises reacting 1,7-dimethyl-7-(1-prop-2-ynyl)nortricyclene, i.e., 2–PNT, with dialkylborane followed by the addition of peroxide and a base. This reaction is illustrated schematically in FIGURE 2.

FIGURE 2

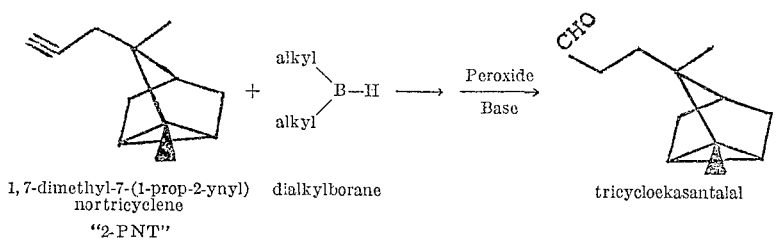

1,7-dimethyl-7-(1-prop-2-ynyl) nortricyclene
"2-PNT"

dialkylborane tricycloekasantalal

The dialkylborane reactant of the above-described reaction can be any dialkylborane compound; preferably each alkyl is a branched or cyclic chain of from about 3 to about 10 carbon atoms. Examples of such preferred dialkylboranes are disiamylborane, diisopinocamphylborane, or dicyclohexylborane. Disiamylborane is particularly preferred. This particular compound can be prepared by mixing diborane with 2-methyl-2-butene in a solvent such as tetrahydrofuran and has the formula shown below.

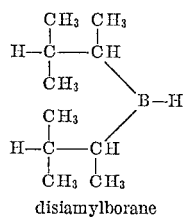

disiamylborane

Preferably, the dialkylborane compound is reacted with 2-PNT in an anhydrous solvent. Preferred anhydrous solvents are ethers, preferably of from 4 to 10 carbon atoms such as diethyl ether, more preferably cyclic monooxy ethers such as tetrahydrofuran, cyclic dioxy ethers such as dioxane, and aliphatic dioxy ethers such as ethylene glycol dimethyl ether or diethylene glycol dimethyl ether. Tetrahydrofuran is a preferred solvent for this reaction. Preferably, the system is homogeneous and therefore the concentration of 2-PNT in the solvent is within the range of from about 1% weight per unit volume to about 3% weight per unit volume and the concentration of the dialkylborane is within the range of from about 0.2% weight per unit volume to about 1% weight per unit volume.

The temperature of this reaction is critical and must be maintained below about 50° C. to avoid the formation of undesired side reactions such as organoborane isomerization or dihydroboration, and to prevent oxidation of the tricycloekasantalal to tricycloekasantalic acid. Preferably, the temperature of the reaction is maintained from about 5° C. to about 25° C.

To prevent undesired oxidations and contaminations, the reaction is preferably carried out in the presence of an inert atmosphere, e.g., in the presence of an inert gas such as nitrogen or argon.

After the 2-PNT and dialkylborane have completely reacted, e.g., after from about ten minutes to about ten hours, to form an intermediate product believed to be π(tricyclyl)-2-ethenyl-dialkylborane, peroxide and a base are added to the reaction mixture with an excess of water, e.g., more than 3 moles of water per mole of 2-PNT reactant, preferably with stirring and maintenance of the temperature within the aforesaid 5°–25° C. range. During this step, the pH of the reaction mixture preferably ranges from about 8 to about 12. Suitable bases are any of the alkali metal hydroxides or oxides such as sodium hydroxide, potassium hydroxide, sodium oxide or potassium oxide. Sodium hydroxide is a preferred base for this reaction. Suitable peroxides are alkali metal peroxides such as sodium peroxide, potassium peroxide, hydrogen peroxide, and lithium peroxide. However, hydrogen peroxide is highly preferred.

The concentration of peroxide in the reaction mixture preferably ranges from about 0.3% weight per unit volume to about 5% weight per unit volume and the concentration of base in the reaction mixture preferably ranges from about 0.3% weight per unit volume to about 1% weight per unit volume.

Preferably, the tricycloekasantalal product is separated from the reaction mixture; this can be accomplished by conventional chromatographic, distillation or extraction techniques.

A preferred method of separating tricycloekasantalal from the reaction mixture is outlined as follows:

The reaction mixture is diluted with water and extracted with n-hexane; the n-hexane extracts are washed with water and saturated sodium chloride, and then dried over anhydrous sodium sulfate; the n-hexane is removed by vacuum distillation and pure tricycloekasantalal is separated from the remaining solution by gas chromatography.

Thus, in summary, this invention in part provides a novel method of preparing tricycloekasantalal which comprises the process of:

(A) Reacting 1,7-dimethyl-7-(1-prop-2-ynyl)nortricyclene with a dialkylborane compound at a temperature below about 50° C.; and
(B) Adding peroxide and a base.

Particular preferred embodiments of said process are as follows: The dialkylborane compound contains branched or cyclic alkyl groups of from about 3 to about 10 carbon atoms each, preferably the dialkylborane is selected from the group consisting of disiamylborane, diisopinocamphylborane, and dicyclohexylborane, most preferably disiamylborane; the solvent is selected from the group consisting of tetrahydrofuran, diethyl ether, dioxane, ethylene glycol dimethyl ether, and diethylene glycol dimethyl ether, preferably, tetrahydrofuran; the concentration of 1,7-dimethyl-7-(1-prop-2-ynyl)nortricyclene in the solvent ranges from about 1% weight per unit volume to about 3% weight per unit volume; the concentration of dialkylborane in the solvent ranges from about 0.2% weight per unit volume to about 1% weight per unit volume; the temperature of the reaction mixture is maintained within the range of from about 5° C. to about 25° C.; the base is selected from the group consisting of sodium hydroxide, potassium hydroxide, sodium oxide, and potassium oxide, preferably sodium hydroxide; the peroxide selected from the group consisting of sodium peroxide, potassium peroxide, hydrogen peroxide, lithium peroxide, preferably hydrogen peroxide; the concentration of peroxide in the reaction mixture ranges from about 0.3% weight per unit volume to about 5% weight per unit volume and the concentration of base in the reaction mixture ranges from about 0.3% weight per unit volume to about 1% weight per unit volume; and the tricycloekasantalal is separated from the reaction mixture.

Examples

The following examples illustrate the invention but are not intended to be limiting. All percentages and ratios in the following examples, as well as in this specification and the appended claims, are by weight unless otherwise indicated.

Data listed in all of the examples were obtained by means of the following instruments and techniques:

Melting points were determined on a Kofler micro hot stage. Boiling points were observed on standard thermometers. Infrared spectra were recorded on a Perkin-Elmer Infracord spectrophotometer. Microanalyses were performed by Dr. F. L. Jackson and associates of the Procter & Gamble Company, Miami Valley Laboratories, Cincinnati, Ohio, or by Spang Microanalytical Laboratories, Ann Arbor, Mich. The NMR. spectra were obtained with a Varian Associates A–60 or a Varian Associates HA–100 instrument in deuterated chloroform or carbon disulfide using tetramethylsilane as an internal reference. Gas-liquid chromatograms (g.l.c.) were obtained on an Aerograph Model 200 analytical instrument using one of two columns. Column A: 20% General Electric SF–96 silicone on 60–80 mesh chromosorb with H.M.D.S. (a conventional silicone coating), 10 foot by 0.25 inch outside diameter. Column B: 20% Reoplex–400 (a conventional polyester packing) on 60–80 mesh chromosorb with H.M.D.S., 10 foot by 0.25 inch outside diameter. The flow rate in either column was 60 ml. per minute.

Example I.—Preparation of 1,7-dimethyl-7-(1-prop-2-ynyl)-nortricyclene and 1,7-dimethyl-7-(1-prop-1-ynyl) nortricyclene.

Part (a): Optimization of the 1,7-dimethyl-7-(1-prop-2-ynyl)nortricyclene product.—A solution of 12.0 g. (0.12 mole) of lithium acetylide (comprising a complex of lithium acetylide and ethylene diamine in a 1:1 ratio) and 9.5 g. (0.06 mole) of π-bromotricyclene in 60 ml. of dimethylsulfoxide was stirred under a nitrogen atmosphere for 160 hours at a temperature of 23–25° C. The reaction mixture was then diluted with 400 ml. of water saturated with ammonium chloride, and extracted five times with 75 ml. portions of n-hexane. The n-hexane extracts were combined, washed with water and saturated sodium chloride, and dried over sodium sulfate. The n-hexane was removed under reduced pressure (20–25 mm.), and the resulting dark brown oil was distilled to give 6.2 g. of a light yellow oil, B.P. 52–61° C./2.7 mm. Analysis of the distillate on column B at 165° C. indicated the presence of three components: 1,7-dimethyl-7-(1-prop-1-ynyl)nortricyclene (31%, $R_T$ (100 sec.), 1,7-dimethyl-7-(1-prop-2-ynyl)nortricyclene (48%, $R_T$ 130 sec.), and π-bromotricyclene (22%, $R_T$ 220 sec.).

Each of the above-mentioned components was then separated from the distilled mixture by g.l.c. on column B.

1,7-dimethyl-7-(1-prop - 2 - ynyl)nortricyclene was collected as a clear oil, B.P. 49–50° C./2.5 mm.; $[\alpha]_D^{25}$– 23.60°;

infrared spectrum: $\lambda_{max.}^{CCl_4}$ 3.00, 3.25 (Sh.), 3.38, 3.46 (Sh.), 4.72, 6.91$\mu$ NMR. spectrum at $\tau_{CDCl_3}$ 9.12 (2H, singlet), 9.05 (3H, singlet), 9.00 (3H, singlet), 8.10 (1H, doublet, $J_{10,12}=2$ c.p.s.), 7.98 (2H doublet, $J_{10,12}=2$ c.p.s.).

Analysis.—Calculated for $C_{12}H_{16}$: C, 89.9; H, 10.1. Found: C, 89.7; H, 10.0.

1,7-dimethl-7-(1-prop-1-ynyl)tricyclene was also collected as a clear oil, B.P. 44–45° C./1.0 mm.;

infrared spectrum: $\lambda_{max.}^{neat}$ 3.26, 3.36, 3.46, 6.92$\mu$

NMR. spectrum at $\tau_{CDCl_3}$ 9.08 (2H, singlet), 8.94 (3H, singlet), 8.84 (3H, singlet), 8.18 (3H, singlet).

Analysis.—Calculated for $C_{12}H_{16}$: C, 89.9; H, 10.1. Found: C, 89.8; H, 10.0.

Part (b): Optimization of the 1,7-dimethyl-7-(1-prop-1-ynyl)nortricyclene product.—A solution of 13.0 g. (0.13 mole) of lithium acetylide (comprising a complex of lithium acetylide and ethylene diamine in a 1:1 ratio) and 11.1 g. (0.05 mole) of π-bromotricyclene in 65 ml. of hexamethylphosphoramide was stirred under a nitrogen atmosphere for 160 hours at a temperature of 25–27° C. The reaction mixture was diluted with 400 ml. of water, saturated with ammonium chloride and extracted five times with 75 ml. portions of n-hexane. The n-hexane extracts were combined, washed with water and saturated sodium chloride, and dried over sodium sulfate. The n-hexane was removed under reduced pressure (20–25 mm.) and the resulting dark brown oil was distilled to give 9.7 g. of a light yellow oil, B.P. 49–62° C./2.7 mm.

This oil was analyzed on column B at 161° C. and contained several solvent impurities (10–20%) and 1,7-dimethyl-7-(1-prop-1-ynyl)nortricyclene (80–90%). The analytical data for this compound was substantially identical to that obtained for 1,7-dimethyl-7-(1-prop-1-ynyl) nortricyclene in part (a) of this example.

In the above example, substantially equivalent results are obtained in that 1,7-dimethyl-7-(1-prop-2-ynyl)nortricyclene and/or 1,7-dimethyl-7-(1-prop - 1 - ynyl)nortricyclene are obtained when the solvent used therein is replaced by a solvent selected from the following group: tetrahydrofuran dioxane, ethylene glycol dimethyl ether, diethylene glycol dimethyl ether, dimethylformamide, dimethylacetamide, N-methyl pyrrolidone, diethylformamide, diethylacetamide, pyridine, tetrahydrothiophene-1,1-dioxide, dimethyl sulfone, diethyl sulfoxide, and mixtures thereof, e.g., in a 1:1 ratio.

Also, in the above example, substantially equivalent results are also obtained in that 1,7-dimethyl-7-(1-prop-2-ynyl)nortricyclene and/or 1,7-dimethyl-7-(1-prop-1-ynyl)nortricyclene are obtained when the ethylene diamine is replaced by an amine stabilizing agent selected from the group consisting of tetramethylethylene diamine and dimethylethylene diamine.

Example II.—Preparation of π[1(3-hydroxy-3-methylbut-1-ynyl)]tricyclene

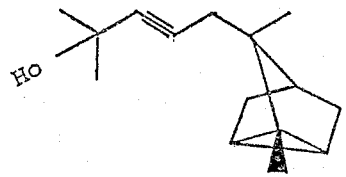

To a solution of 2.0 g. (12.5 m. moles) of 1,7-dimethyl-7-(1-prop-2-ynyl)nortricyclene in 75 ml. of tetrahydrofuran maintained at 0° C. was added 6.8 ml. of 1.84 molar ethereal phenyl lithium; the resulting mixture was stirred one hour under an argon atmosphere. A solution of 0.725 g. (12.5 m. moles) of acetone in 10 ml. of tetrahydrofuran was added dropwise with stirring and the resulting solution stirred overnight at room temperature. Saturated ammonium chloride solution was added and the tetrahydrofuran removed under reduced pressure (20–25 mm.). The residue was diluted with saturated sodium chloride solution and extracted with diethyl ether. The ethereal layer was washed with saturated sodium chloride solution, dried over sodium sulfate and filtered. The ether was removed under reduced pressure (20–25 mm.) to afford 2.69 g. of residue. This residue was adsorbed on 25 g. of activity III neutral alumina and eluted with diethyl ether (1 to 3%) in hexane to yield 730 mg. of π[1(3-hydroxy-3-methylbut-1-ynyl)]tricyclene;

infrared spectrum: $\lambda_{max.}^{CH_2Cl_2}$ 2.73, 2.86, 3.39, 4.47, 6.03$\mu$ Analysis.—Calculated for $C_{15}H_{22}O$: C, 82.51; H, 10.16. Found: C, 82.43; H, 10.28.

Example III.—Preparation of π[1(3-hydroxy-3-methylbutyl)]tricyclene

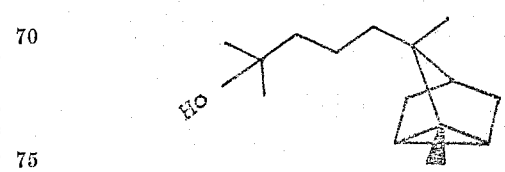

A solution of 3 g. of π[1(3-hydroxy-3-methylbut-1-ynyl)]tricyclene in 50 ml. of ethanol was hydrogenated in a Parr Apparatus (a conventional laboratory hydrogenerator) with hydrogen at a pressure of 40 p.s.i. for 10 minutes in the presence of 0.1 g. of Pd/CaCO₃ catalyst. The catalyst was removed by filtration and the ethanol was removed under reduced pressure (20–25 mm.) to yield 3.0 g. of crystalline material, M.P. 46–48° C. Recrystallization of this material from hexane gave a solid material, M.P. 51.9–52.3° C. identified as π[1(3-hydroxy-3-methylbutyl)]tricyclene;

infrared spectrum: $\lambda_{max.}^{CH_2Cl_2}$ 2.74, 3.40, 3.46 (Sh.) μ

NMR. spectrum: $\tau_{CDCl_3}$ 9.16 (5H, singlet), 8.99 (3H, singlet), 8.78 (6H, singlet).

Analysis.—Calculated for $C_{15}H_{26}O$: C, 81.02; H, 11.79. Found: C, 81.07; H, 11.74.

In the above example, π[1(3-hydroxy-3-methylbut-1-cis-enyl)]tricyclene, i.e.,

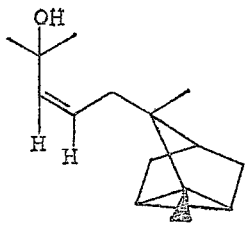

is prepared when a Pd/barium sulfate catalyst is substituted for the Pd/CaCO₃.

Example IV.—Preparation of π[1(3-hydroxy-3-acetoxymethylbut-1-ynyl)]tricyclene

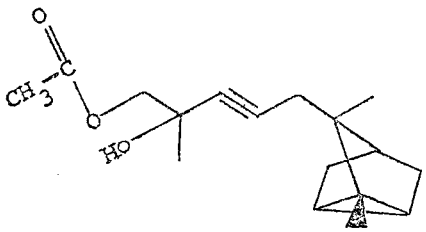

To a solution of 5.0 g. (31.35 mmoles) of 1,7-dimethyl-7-(1-prop-2-ynyl)nortricyclene in 100 ml. of tetrahydrofuran maintained at 0° C. was added 17 ml. of 1.84 M phenyl lithium in ether solution under an argon atmosphere. The reaction mixture was stirred for one hour, at which time 10 ml. of a solution of 3.62 g. (31.25 mmoles) of acetonylacetate in 10 ml. of tetrahydrofuran was added dropwise with stirring. Stirring was continued for two hours and the mixture was diluted with 2 liters of water and extracted with ether. The ether layer was washed with water and dried over sodium sulfate. The ether was removed under reduced pressure (20–25 mm.) to yield 8.0 g. of residual oil. This oil was absorbed on 150 g. of Florisil and eluted with ether-benzene (1:1) to give 1.46 g. of π[1(3-hydroxy-3-acetoxymethylbut-1-ynyl)]tricyclene;

nfrared spectrum: $\lambda_{max.}^{neat}$ 2.85, 3.24 (Sh.), 3.35, 344 (Sh.), 5.68, 9.51μ

Example V.—Preparation of π[1(3-hydroxy-3-acetoxymethylbutyl)] tricyclene

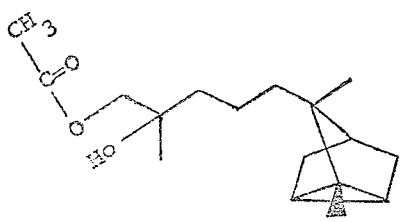

A solution of 1.46 g. of π[1(3-hydroxy-3-acetoxymethyl-but-1-ynyl)]tricyclene in 50 ml. of ethanol was hydrogenated on Parr Apparatus at 45.5 p.s.i. of hydrogen for 30 minutes in the presence of 55 mg. of a 10% Pd/C catalyst. The catalyst was removed by filtration and the ethanol removed under reduced pressure (20–25 mm.) to yield a 1.27 g. of a light yellow oil. The oil was absorbed on 25 g. of silica gel and eluted with diethyl ether to give 1.09 g. of π[1(3-hydroxy-3-acetoxymethylbutyl)]tricyclene;

infrared spectrum: $\lambda_{max.}^{CH_2Cl_2}$ 2.76, 3.29 (Sh.), 3.38, 3.48 (Sh.), 5.75, 9.63μ

In the above example, π[1(3-hydroxy-3-acetroxymethyl-but-1-cis-enyl)]tricyclene, i.e.,

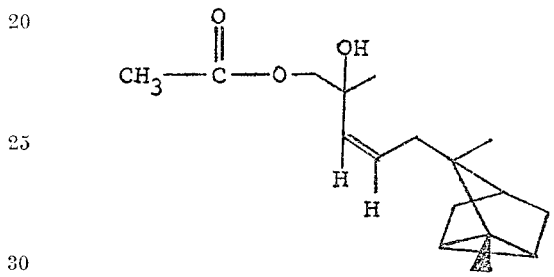

is prepared when a Pd/barium sulfate catalyst is substituted for the Pd/C catalyst.

Example VI.—Preparation of tricycloekasantalal

To a solution of 1.6 g. of disiamylborane in 65 ml. of tetrahydrofuran was slowly added 1.5 g. (9.6 mmoles) of 1,7dimethyl-7-(1-prop-2-ynyl)notricyclene. [The disiamylborane solution was prepared by adding 10 ml. of a 1.0 molar diborane/tetrahydrofuran solution to 5 ml. of 2-methyl-2-butene.] The reaction mixture was stirred under a nitrogen atmosphere for 2.5 hours while the temperature was maintained at 25–26° C. To the reaction mixture maintained at a temperature of about 15° C. was added 12 ml. of a 30% hydrogen peroxide solution followed by 12 ml. of a 3 N sodium hydroxide solution. The resulting solution was stirred for an additional 30 minutes at 25–26° C. The reaction mixture was then diluted with 200 ml. of water and extracted with six 80 ml. portions of n-hexane. The n-hexane extracts were combined, washed with water and saturated sodium chloride, and then dried over anhydrous sodium sulfate. The n-hexane was removed under reduced pressure (20–25 mm.) to give 2.162 g. of a light yellow oil. Analysis of this oil on on column A at 165° C. indicated the presence of tricycloekasantalal (47%, $R_T$ 490 sec.).

Tricycloekasantalal was collected as a clear oil;

infrared spectum: $\lambda_{max.}^{CCl_4}$ 3.28, 3.40, 3.69, 5.81, 6.88μ

NMR. spectrum: $\tau_{CDCl_3}$ 9.10 (3H, singlet), 9.02 (2H, singlet), 8.89 (3H, singlet), 7.55 (2H, sextet, $J_{11,12}=2$ c.p.s., $J_{10,12}=8$ c.p.s.), 0.10 (1H, triplet, $J_{11,12}=2$ c.p.s.).

In the above example, substantially equivalent results are obtained in the tricycloekasantalal is formed when either of the following dialkylboranes are substituted for the disiamylborane of the example: diisopinocamphylborane; dicyclohexylborane.

Also, in the above example, substantially equivalent results are obtained in that tricycloekasantalal is formed when one of the following solvents is substituted for the tetrahydrofuran of the example: diethyl ether, dioxane, ethylene glycol dimethyl ether, and diethylene glycol dimethyl ether.

13

Example VII.—Perfume compositions

A perfume composition is prepared by intermixing the components shown below.

| Component: | Percent by weight |
|---|---|
| 2-PNT | 5.00 |
| Cassia | 6.00 |
| Clove | 12.00 |
| Coumarin | 10.00 |
| Geranium | 10.00 |
| Spike Lavender | 10.00 |
| Lavender | 8.00 |
| Patchouli | 5.00 |
| Sandalwood | 10.00 |
| Musk Ambrette | 2.50 |
| Rosemary | 21.50 |

This composition exhibits a highly desirable and useful odor. A substantially equivalent desirable and useful odor is observed when 1-PNT is substituted for 2-PNT in the composition.

As discussed hereinbefore, 2-PNT and 1-PNT are useful in various perfume compositions. Thus, the components and proportions in the perfume composition of this example can be adjusted according to methods well known in the perfume art to form a wide variety of desirable perfume compositions containing odoriferously effective amounts of 2-PNT or 1-PNT.

Example VIII.—Detergent compositions

A conventional heavy-duty built detergent having the following composition is prepared.

| Ingredient: | Percent by weight |
|---|---|
| Sodium dodecyl benzene sulfonate | 20.00 |
| Sodium tripolyphosphate | 50.00 |
| Sodium silicate | 6.00 |
| Sodium sulfate | 14.00 |
| Water | 9.80 |
| Perfume composition of Example VII (containing 5% of 2-PNT) | 0.20 |

This detergent composition exhibits a highly desirable odor. The detergent composition exhibits a substantially equivalent desirable odor when 1-PNT is substituted for 2-PNT in the perfume composition.

Other perfume compositions employing odoriferously effective amounts of 2-PNT or 1-PNT can be substituted for the perfume composition in the detergent composition of this example according to methods well known in the perfume art.

Example IX.—Detergent bar compositions

A conventional household detergent bar having the following composition is prepared.

| Ingredient: | Percent by weight |
|---|---|
| Sodium soap | 75.00 |
| Potassium soap | 7.50 |
| (The total soap comprises a mixture of 80% tallow soap and 20% coconut soap.) | |
| Water | 15.00 |
| Perfume composition of Example VII (containing 5% of 2-PNT) | 2.50 |

This detergent bar exhibits a highly desirable odor. The detergent bar exhibits a substantially equivalent desirable odor when 1-PNT is substituted for 2-PNT in the perfume composition.

Other perfume compositions employing odoriferously effective amounts of 2-PNT or 1-PNT can be substituted for the perfume composition in the detergent bar of this example according to methods well known in the perfume art.

What is claimed is:

1. As a novel composition of matter, a tricyclene compound of the general formula

14

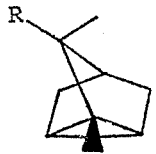

wherein R is selected from the group consisting of

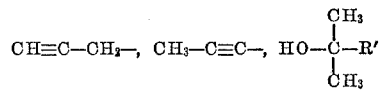

and

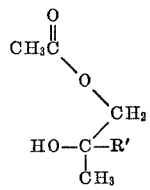

and R' is a radical selected from the group consisting of

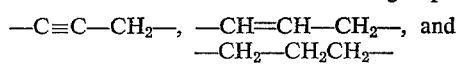

2. 1,7-dimethyl-7-(1-prop-2-ynyl)nortricyclene.
3. 1,7-dimethyl-7-(1-prop-1-ynyl)nortricyclene.
4. The method of preparing a compound selected from the group consisting of 1,7-dimethyl-7-(1-prop-2-ynyl)nortricyclene, 1,7 - dimethyl - 7 - (1-prop-1-ynyl)nortricyclene and mixtures thereof, which comprises reacting π-bromotricyclene with lithium acetylide.
5. The method of claim 4 wherein said process is carried out in a solvent selected from the group consisting of ethers, amides, amines, phosphoramides, sulfones and sulfoxides.
6. The method of claim 4 wherein said process is carried out in a solvent selected from the group consisting of dimethylsulfoxide, dimethylforamide, and hexamethylphosphoramide.
7. The method of claim 4 wherein said lithium acetylide comprises a complex of lithium acetylide with an amine stabilizing agent.
8. The method of claim 7 wherein said stabilizing agent is ethylene diamine.

References Cited

UNITED STATES PATENTS

| | | | |
|---|---|---|---|
| 3,052,734 | 9/1962 | Adams et al. | 260—651 |
| 3,156,676 | 11/1964 | Dekking | 260—666 |
| 3,207,804 | 9/1965 | Adams et al. | 260—666 |
| 3,296,260 | 1/1967 | Knoth | 260—439 |
| 3,296,321 | 1/1967 | Adams et al. | 260—666 |
| 3,347,943 | 10/1967 | Hubert | 260—666 |
| 2,782,238 | 2/1957 | Bluestone et al. | 260—666 |
| 2,730,548 | 1/1956 | Bluestone et al. | 260—586 |
| 3,345,419 | 10/1967 | Tinsley et al. | 260—617 |

OTHER REFERENCES

Corey et al., J. Amer. Chem. Soc., 79, 5773–7, 1957.

Gassman et al., J. Amer. Chem. Soc., 87, 1079–83, 1965.

Lewis et al., Tetrahedron Letters, 1967 (5) 401–6.

Simonsen, The Terpenes, vol. II, 2nd ed., Cambridge Press, pp. 333–9, 1949.

Roberts et al., J. Amer. Chem. Soc., 77, pp. 3034–37, 1955.

Ramaswami et al., Org. Chem., 27, pp. 2761–63, 1962.

DELBERT E. GANTZ, Primary Examiner.

VERONICA O'KEEFE, Assistant Examiner.